United States Patent [19]

Nickens et al.

[11] Patent Number: 5,900,216

[45] Date of Patent: May 4, 1999

[54] VENTURI REACTOR AND SCRUBBER WITH SUCKBACK PREVENTION

[75] Inventors: Dan A. Nickens, Windermere; Charles C. Mattern, Cleremonte, both of Fla.

[73] Assignee: Earth Resources Corporation, Ocoee, Fla.

[21] Appl. No.: 08/665,824

[22] Filed: Jun. 19, 1996

[51] Int. Cl.$^6$ .................................................. B01D 53/34
[52] U.S. Cl. ........................ 422/168; 422/169; 422/170; 95/149; 261/DIG. 14; 423/210
[58] Field of Search ..................................... 422/168, 169, 422/170; 261/DIG. 54; 423/210; 95/149

[56] References Cited

U.S. PATENT DOCUMENTS

| | | |
|---|---|---|
| Re. 33,799 | 1/1992 | Gold . |
| 45,183 | 11/1864 | Sexton . |
| 314,085 | 3/1885 | Van Norman . |

(List continued on next page.)

FOREIGN PATENT DOCUMENTS

| | | |
|---|---|---|
| 1607991 | of 0000 | Germany . |
| 950614 | of 0000 | Germany . |
| 2120761 | 12/1983 | United Kingdom . |
| PCT/US94/ 04797 | 4/1994 | WIPO . |

OTHER PUBLICATIONS

"Alternative Technologies For The Destruction Of Chemical Agents And Munitions," Committee on Alternative Chemical Demilitarization Technologies, Board on Army Science and Technology, Commission on Engineering and Technical Systems, National Research Council, pp. 1–21, 1993.

American Petroleum Institute, API Publication 2201, "Procedures For Welding or Hot Tapping On Equipment Containing Flammables," Third Edition, Oct. 1985.

Department of the Army, Office of the AMC Program Manager for Demilitarization of Chemical Materiel, "Supplement C to Project Eagle–Phase II Demilitarization and Disposal of the M34 Cluster at Rocky Mountain Arsenal Final Plan," pp. viii–ix, 15–2 1, IC–1, 2C–15, Feb. 1973.

ERC, Comprehensive Management of Compressed Gases.

ERC, "Statement of Qualifications –Compresses Gas Management Services", 1993

ERC, "Providing The Total Solution To Compressed Gas Problems With A Commitment To Safety & Quality", 1993.

E.I. DuPont de Nemours & Co., Chemicals and Pigments Department, "Krytox Fluorinated Greases, The Clear Choice For Safe, Versatile, Dependable Performance," November, 1988.

E.I. DuPont de Nemours & Co., Chemicals and Pigments Department, "Krytox Severe Service Lubricants for Industrial, Automotive, Aerospace and Electronic Applications," distributed by Technical Marketing Company, Inc.

(List continued on next page.)

*Primary Examiner*—Ponnathapura Achutamurthy
*Attorney, Agent, or Firm*—Hunton & Williams

[57] ABSTRACT

A venturi eduction and scrubbing system comprising a first container and a second container in fluid communication each having a liquid treatment reagent therein. The liquid treatment reagent establishes liquid levels in the first and second containers. A waste inlet which contains waste gas or liquid to be processed is connected to at least one venturi eductor. The venturi eductors are also connected to the first container and are disposed above the liquid level of the first and second container. A pump is connected to the second container and each venturi eductor. The pump enables liquid treatment reagent to be pumped from the second container into the venturi eductors such that the waste gas or liquid is drawn from the waste inlet into the venturi eductors where it combines with the liquid treatment reagent and is thereby neutralized. The arrangement of contains and venturies provide a failsafe mechanism for preventing suckback into the waste container.

16 Claims, 6 Drawing Sheets

U.S. PATENT DOCUMENTS

| | | |
|---|---|---|
| 381,950 | 5/1888 | Pratt . |
| 572,786 | 12/1896 | Downey . |
| 1,167,178 | 1/1916 | Hill . |
| 1,371,103 | 3/1921 | Lucas . |
| 1,591,932 | 7/1926 | Young . |
| 1,806,270 | 7/1931 | Thompson . |
| 2,051,981 | 8/1936 | Bowman . |
| 2,101,762 | 12/1937 | Straub . |
| 2,338,583 | 1/1944 | Hickman . |
| 2,379,436 | 7/1945 | Hickman . |
| 2,488,157 | 11/1949 | Bassano . |
| 2,496,606 | 2/1950 | Smith . |
| 2,911,859 | 11/1959 | Longley . |
| 2,985,050 | 5/1961 | Schwacha . |
| 3,091,052 | 5/1963 | Ryan . |
| 3,333,735 | 8/1967 | Odasso . |
| 3,364,939 | 1/1968 | Valenziano . |
| 3,394,905 | 7/1968 | Rapp . |
| 3,422,808 | 1/1969 | Stein . |
| 3,428,037 | 2/1969 | Capriolo . |
| 3,481,529 | 12/1969 | Mugele . |
| 3,486,840 | 12/1969 | Burton . |
| 3,495,615 | 2/1970 | Ehrens . |
| 3,558,883 | 1/1971 | Bench . |
| 3,662,791 | 5/1972 | Ruscitti . |
| 3,719,028 | 3/1973 | Brooks . |
| 3,746,256 | 7/1973 | Hall . |
| 3,821,965 | 7/1974 | Reynolds . |
| 3,870,474 | 3/1975 | Houston . |
| 3,926,135 | 12/1975 | DeGregorio . |
| 3,926,340 | 12/1975 | Tygenhof . |
| 3,929,411 | 12/1975 | Takano . |
| 3,974,846 | 8/1976 | Serota . |
| 3,983,756 | 10/1976 | Danguillier . |
| 3,993,221 | 11/1976 | Boynton . |
| 3,995,655 | 12/1976 | Sands . |
| 4,038,032 | 7/1977 | Brewer . |
| 4,046,055 | 9/1977 | McDanolds . |
| 4,110,929 | 9/1978 | Weigand . |
| 4,112,797 | 9/1978 | Pearl . |
| 4,132,504 | 1/1979 | Fitch . |
| 4,160,806 | 7/1979 | Long . |
| 4,166,481 | 9/1979 | Farris . |
| 4,168,243 | 9/1979 | Gablin et al. . |
| 4,169,403 | 10/1979 | Hanson . |
| 4,208,383 | 6/1980 | Kisters . |
| 4,213,479 | 7/1980 | Pearson . |
| 4,235,739 | 11/1980 | Baatz . |
| 4,255,168 | 3/1981 | Nguyen . |
| 4,274,453 | 6/1981 | Lee . |
| 4,312,254 | 1/1982 | Pearl . |
| 4,344,467 | 8/1982 | Lahde . |
| 4,349,054 | 9/1982 | Chipman . |
| 4,350,052 | 9/1982 | Kendall . |
| 4,386,637 | 6/1983 | Buchanan . |
| 4,399,829 | 8/1983 | Schuler . |
| 4,407,341 | 10/1983 | Feldt . |
| 4,411,846 | 10/1983 | Ulrich . |
| 4,421,037 | 12/1983 | Uam . |
| 4,452,377 | 6/1984 | Hurley . |
| 4,475,566 | 10/1984 | Haines . |
| 4,500,015 | 2/1985 | Penney . |
| 4,580,700 | 4/1986 | Rush . |
| 4,620,466 | 11/1986 | Jumel . |
| 4,665,827 | 5/1987 | Ellis . |
| 4,679,987 | 7/1987 | Olsen . |
| 4,690,180 | 9/1987 | Gold . |
| 4,718,834 | 1/1988 | Ebner et al. . |
| 4,734,108 | 3/1988 | Cox . |
| 4,762,467 | 8/1988 | Ackermann et al. . |
| 4,792,284 | 12/1988 | Straub . |
| 4,795,315 | 1/1989 | Schultze . |
| 4,874,587 | 10/1989 | Galloway . |
| 4,875,420 | 10/1989 | Hay . |
| 4,881,517 | 11/1989 | Wackrow . |
| 4,944,333 | 7/1990 | Gold . |
| 4,966,317 | 10/1990 | Barr . |
| 5,017,047 | 5/1991 | Myles . |
| 5,025,730 | 6/1991 | Petrovich . |
| 5,030,039 | 7/1991 | Dove . |
| 5,035,269 | 7/1991 | Pytryga . |
| 5,055,003 | 10/1991 | Svensson . |
| 5,067,529 | 11/1991 | Gonzalez-Miller . |
| 5,076,311 | 12/1991 | Marschke . |
| 5,114,043 | 5/1992 | Collins, Jr. . |
| 5,134,921 | 8/1992 | Breed . |
| 5,150,909 | 9/1992 | Fitzwater . |
| 5,163,462 | 11/1992 | Leemput . |
| 5,163,483 | 11/1992 | Eckman . |
| 5,163,585 | 11/1992 | Campbell . |
| 5,174,344 | 12/1992 | Gonzalez-Miller . |
| 5,186,219 | 2/1993 | Gold . |
| 5,197,863 | 3/1993 | Dardis et al. . |
| 5,210,368 | 5/1993 | Heller . |
| 5,230,324 | 7/1993 | Van Horssen . |
| 5,265,762 | 11/1993 | Campbell . |
| 5,269,352 | 12/1993 | Gold . |
| 5,271,437 | 12/1993 | O'Brien . |
| 5,273,088 | 12/1993 | Cripe . |
| 5,275,214 | 1/1994 | Rehberger . |
| 5,279,646 | 1/1994 | Schwab . |
| 5,303,749 | 4/1994 | Stock . |
| 5,325,787 | 7/1994 | Boual . |
| 5,337,793 | 8/1994 | Gold . |
| 5,339,876 | 8/1994 | Mattern . |
| 5,340,244 | 8/1994 | Hawley . |
| 5,365,913 | 11/1994 | Walton . |
| 5,383,499 | 1/1995 | Mattem . |
| 5,427,157 | 6/1995 | Nickens et al. . |
| 5,460,154 | 10/1995 | Mattern et al. . |
| 5,474,114 | 12/1995 | Nickens et al. . |
| 5,499,665 | 3/1996 | Gold . |
| 5,507,604 | 4/1996 | Hawley et al. . |

OTHER PUBLICATIONS

E.I. DuPont de Nemours & Co., Chemicals and Pigments Department, "Krytox Vacuum Pump Fluids. The Clear Choice for Superior Performance In Vacuum Systems." (no date).

E.I. DuPont de Nemours & Co., Chemicals and Pigments Department, Krytox fluorinated grease, "One Grease Fits All." (no date).

E.I. DuPont de Nemours & Co., Chemicals and Pigments Department, Krytox Marketing, "Vacuum Pump Fluids." (no date).

Generic Specifications For the Treatment of CWM, Section 7.3, U.S. Army Manual, pp. 7.15–7.19.

"No Known Treatment For Accident Victims," Sunday Times, Trenton, N.J., Feb. 28, 1982, p. 87.

Memo, CECOS International. Inc. to Environmental Emergency Branch, Mar. 17, 1982, pp. 1–5.

Memo, New Jersey State Department of Environmental Protection, Feb. 4, 1982, two pages.

"Pentaborance Release, Environmental Laboratories, Hanover County, Va.," National Response Team Briefing, Mar. 1982.

"Poison Spills Impact Remains," Richmond Times–Dispatch, Mar. 16, 1983, pp. A1–A2.

Pytrga, "Emergency Containment System," pp. 43–46.

Solkatronic Chemicals Inc., "Instruction Manual For Model 5502 Emergency Response Containment Vessel," Oct. 1990.

"Something Out Of A Space Movie," Richmond Times–Dispatch, Feb. 1982, pp. A1–A2.

State of Florida, Agency for Health Care Administration, "Minutes of the joint committee meeting with the Community Health Purchasing Alliance (CHPA) Data Advisory Committee and the Comprehensive Health Related Information System (CHFIS) Advisory Council," August, 1993.

"This Stuff is Getting to All of Us!", Fire Engineering, Apr. 1983, pp. 21, 25–28.

U.S. Army Corps of Engineers, Kansas City District, Superfund Project, DACW41–87–B0886, "Specifications for Chemical Control Site Gas Cylinder Removal," Jun. 1987.

U.S. Army Chemical Material. "Generic Destruction Agency Scooping Study", Dec. 3, 1993.

"Shock Test Squeezes Core Temperature", Science, vol. 267, Mar. 17, 1995.

"Big Gun Makes Hydrogen Into a Metal", The New York Times, Mar. 26, 1996.

VENTURI REACTOR AND SCRUBBER WITH SUCKBACK PREVENTION

RELATED APPLICATIONS

This application is related by subject matter to commonly owned patent application Ser. No. 08/267,300 entitled "System For Removal Of Unknown Corrosive Or Potentially Hazardous Gases From A Gas Container," which was filed on Jun. 29, 1994, now U.S. Pat. No. 5,636,666 and which is a continuation of U.S. Pat. No. 5,383,499 entitled "System For Removal Of Unknown Corrosive Or Potentially Hazardous Gases From A Gas Container."

FIELD OF THE INVENTION

The invention generally relates to vacuum eductors for scrubbers and particularly to vacuum eductors for removing hazardous materials from containers into a scrubber to neutralize or reduce the hazardous nature of the material.

BACKGROUND OF THE INVENTION

Scrubbers are widely used to neutralize or reduce the hazardous nature of hazardous materials and prevent their discharge into the environment. "Scrubbing" is a process whereby a gas or liquid is chemically reacted with another substance to produce a more safe and more easily handled product. Many types of scrubbers are known for performing this function. For example, packed and plate tower scrubbers are a very common type of scrubber for use in gas absorption. Other types of scrubbers include stirred tanks, sparged towers, spray towers, and falling-film absorbers.

Another type of scrubber, the venturi scrubber, is typically used in applications requiring particulate removal of hazardous material from a gas stream. Venturi scrubbers employ a concurrent flow of liquid and gas to remove material from the gas. These types of scrubbers are generally well known as is documented in a government report filed by Yung, Calvert, and Barbarika (NTIS, PB-271, 515, U.S. Dept. of Commerce, August, 1977).

Current venturi designs typically use one of three approaches: (1) a "wet approach" or "flooded-wall" entry section; (2) an adjustable throat venturi to accommodate pressure drops; or (3) a "flooded-elbow" located below the venturi. Another type of venturi-scrubber is disclosed in commonly owned U.S. Pat. No. 5,383,499. The scrubber described in the '499 Patent injects a gas stream into a reactor vessel fitted with baffles to increase reaction time. The units are best suited for gases which readily absorb or react with the scrubber liquid.

A simple scrubber unit is shown in prior art FIG. 1. FIG. 1 depicts a scrubber system 100 which comprises a container 10. A liquid treatment reagent is stored in container 10 and establishes a liquid level 24. Waste gas or liquid to be scrubbed is drawn into container 10 via inlet pipe 12 by a venturi eductor 14 disposed below liquid level 24 in container 10. The liquid treatment reagent and the waste gas or liquid react in venturi eductor 14 and in container 10 and the cleansed gas is released through an exhaust pipe 16 for further disposal. The motive force for venturi eductor 14 is generated by a flow of the liquid treatment reagent through reagent inlet pipe 18 from pump 20. Pump 20 draws liquid treatment reagent from container 10 via reagent withdrawal pipe 22. Under normal operating conditions, this system operates effectively to withdraw and scrub waste gas or liquids.

Such a scrubber, however, has the potential problem of "suckback." Suckback is a phenomena that occurs when liquid flow through venturi eductor 14 from pump 20 stops. Due to the vacuum conditions, the liquid in container 10 is sucked up into inlet pipe 12 and may be drawn back into the waste gas or liquid container. If the liquid enters a container which contains a product which is exothermically reactive, the uncontrolled reaction may produce catastrophic consequences.

One way to attempt to limit suckback is to place an automatic valve in stream with inlet pipe 12 to isolate the waste gas or reactor vessel from venturi eductor 14. The automatic valve senses the presence of liquid and closes down to isolate the liquid from the waste gas vessel. The automatic valve is not failsafe, however, and thus only limits the potential for suckback. Other drawbacks also exist.

SUMMARY OF THE INVENTION

Accordingly, it an object of the present invention to overcome these and other disadvantages of past scrubber systems.

It is also an object of the invention to provide a simple, reliable, and fail safe treatment mechanism for vacuum eduction of hazardous materials.

It is another object of the present invention to provide an effective mechanism for eduction of hazardous gases and materials into an absorption media.

It is a further object of the present invention to provide for eduction of gases or other materials into a reaction vessel for neutralization or conversion to less hazardous compounds.

It is a further object of the invention to provide a mechanism for removal and treatment of gases, liquids, or other media from an enclosed system or container through vacuum eduction into a venturi. The hazardous material system may also be introduced through pressure in the closed waste gas or liquid container, followed by an evacuation and purge cycle using an inert gas.

According to one embodiment of the present invention, a venturi eduction and scrubbing system comprises a first container and at least a second container in fluid communication therewith, each container having a liquid treatment reagent therein. The liquid treatment reagent establishes a liquid level in the first and second containers. A waste inlet which contains waste gas or liquid to be processed is connected to at least one venturi eductor. The venturi eductors are also connected to the first container and are disposed above the liquid level of the first and second containers. A pump is connected to the second container and each venturi eductor. The pump forces liquid treatment reagent from the second container into the venturi eductors. As a result, the waste gas or liquid is drawn from the waste inlet into the venturi eductors where it combines with the liquid treatment reagent and is thereby neutralized.

In another embodiment of the present invention, a system and method are provided for introduction of gases or liquids into a reaction vessel by one or more venturi eductors located on top of one of two or more containers in serial fluid communication. A liquid circulating pump circulates liquid from a first container into the venturi eductors located on top of a second, preferably similarly-sized, sealed container (or pressure vessel). A liquid treatment reagent flowing through the venturi eductors induces a low pressure area creating a vacuum which draws gases or liquids into the second sealed container. Liquid treatment reagent from the second container is displaced through piping into the first container (and any intermediate containers which may be provided) where it may be recirculated by the liquid circulating pump. An exhaust is provided in the first container for exhaust of inert gases. Baffles may be added in the first container to enhance dispersion of unreacted gases.

According to one feature of this embodiment, the liquid treatment reagent is filled to a level of no more than one half of the total capacity of the first and second containers. Liquid treatment reagent in the second container may be displaced into the first container without overfilling the first container. In the event of a failure of the liquid circulating pump or disruption of liquid flow through one or more of the venturi educators, liquid treatment reagent from the first container may be drawn into the second container by the effects of the vacuum induced through the venturi eductors. The liquid treatment reagent only returns to the original fill level and cannot enter the waste inlet piping.

According to another embodiment of the present invention, the first container (and a plurality of other containers if desired) may be disposed within the second container. Each internal container, i.e., those disposed within the second container, communicates with one of the inlets from the venturi eductors. Liquid treatment reagent in the containers is circulated from the bottom of the containers through a liquid pump which discharges the liquid treatment reagent to the venturi eductor. Flow of the liquid treatment reagent through the venturi eductors creates a vacuum which draws waste gases or liquids into the venturi educators where they react with the liquid treatment reagent. Exhaust from the venturi eductors exits into the first or other internal containers. The liquid treatment reagent level in the internal containers may be displaced into the area between the internal containers and the second container. Inert gases may pass from the internal containers at their lowermost edge and into the second container to be exhausted.

According to one feature of this embodiment, baffling may be added to the lower portion of the containers to provide separation between the exhaust from the venturi educators and the inlet of the liquid pump. This baffling prevents exhaust gases from becoming entrained in the recirculating liquid which could result in cavitation in the pump. Baffling may also be used between the internal containers and second container to disperse gases exhausting from the internal containers. This baffling creates additional surface area in the exhausted gas increasing the probability of reaction and system efficiency.

According to another feature of this embodiment, the liquid treatment reagent level is preferably filled to approximately one half of the total capacity of the containers. In operation, liquid treatment reagent from the internal containers is displaced into the region defined between the outer surface of the internal containers and the inner surface of the second container. The volume of the region is at least equal to that of the volume of liquid originally contained in the internal containers which prevents liquid from being displaced through the container exhaust. In the event of a failure of the liquid pump or cessation of flow through one or more of the venturi educators under conditions of vacuum, liquid treatment reagent in the region returns to the original equilibrium level in the internal containers and is not pulled back onto the gas inlet piping.

A technical advantage of the above-described embodiments is that the potential for suckback of a reactive liquid in an uncontrolled manner is eliminated. Another advantage is that a simple, inexpensive, reliable, fail safe treatment system is available for hazardous liquids and gases. Further objects, features, and advantages of the present invention will be understood from the detailed description of the preferred embodiments of the present invention and from the figures.

DESCRIPTION OF THE PREFERRED EMBODIMENTS

Figure 1:
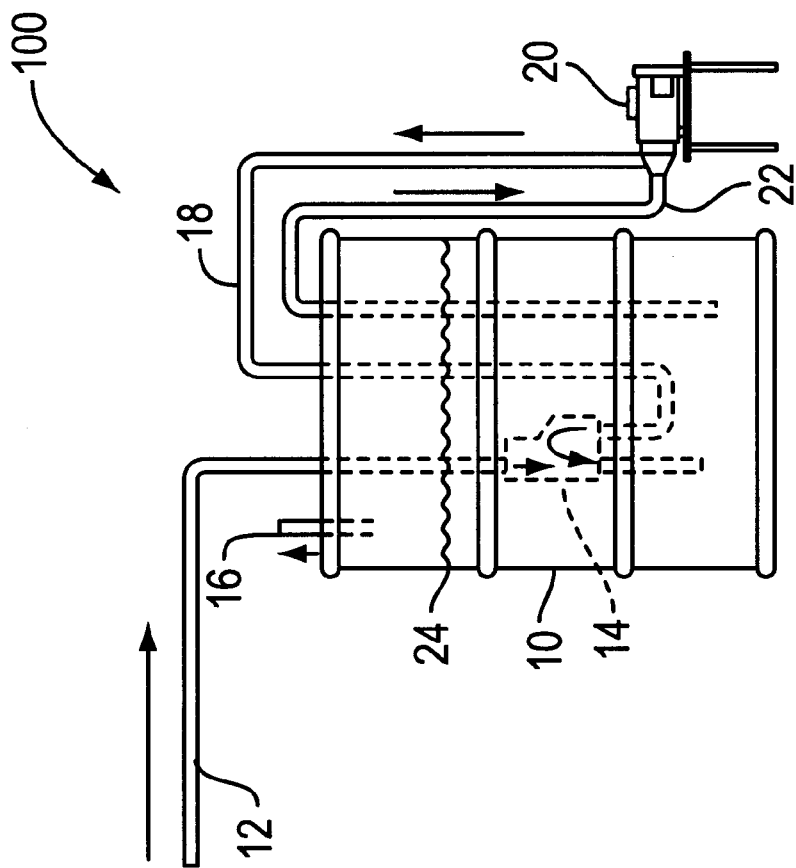
FIG. 1 depicts a single container scrubber system of the prior art.
Figure 2:
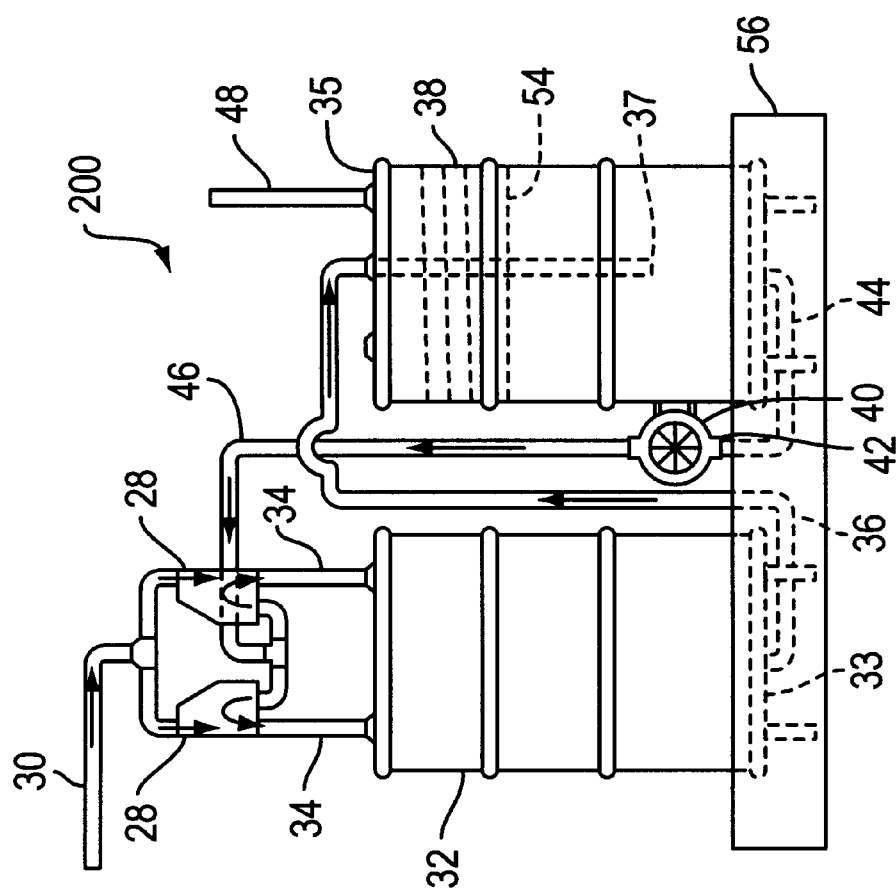
FIG. 2 depicts a venturi eduction and scrubbing system according to one embodiment of the present invention.

According to one embodiment of the present invention, a venturi eduction and scrubbing system 200 is depicted in FIG. 2. System 200 comprises a plurality of venturi eductors 28 which are connected via inlet piping 30 to a waste gas or liquid container (not shown). The waste gas or liquid container may comprise any type of waste containment vessel for secure handling of hazardous or polluted materials.

As shown in FIG. 2, venturi eductors 28 may be mounted on top of a drain container 32 by venturi exhaust piping 34. Venturi exhaust piping 34 provides fluid communication between the interior of drain container 32 and venturi eductors 28. A connection piping 36 provides fluid communication between a bottom portion 33 of drain container 32 and a top portion 35 of source container 38. Connection piping 36 comprises an exhaust end 37 which may extend through top portion 35 of source container 38 into the interior of source container 38 as depicted in FIG. 2, for example.

A liquid circulating pump 40 may be provided to pump liquid from source container 38 to venturi eductors 28. A source piping 44 provides fluid communication between source container 38 and the inlet side of liquid circulating pump 40. A venturi input piping 46 provides fluid communication between liquid circulating pump 40 and venturi eductors 28. As such, drain container 32, source container 38, liquid circulating pump 40, and venturi eductors 28 may be in serial fluid communication with each other to form a continuous loop through which liquid treatment reagent travels.

Source container 38 may also be provided with an exhaust piping 48 for releasing gases. Exhaust piping 48 may be connected to various mechanisms for safely disposing or containing exhausted gases. The materials of construction for exhaust piping 48 and the other pipings and components used in the present invention may be selected based on the specific application. For most applications, a coated steel is preferred. Other less demanding applications may incorporate PVC piping, for example. The venturi eductors are commonly made of brass or PVC, although other materials may also be used.

Because some liquid treatment reagent may escape through exhaust piping 48, it may be desirable to place a containment mechanism between the interior of source container 38 and exhaust piping 48. In one embodiment, a plurality of horizontally positioned perforated baffle plates 54 may be disposed in source container 38 above exhaust end 37 of connection piping 36 in the space between connection piping 36 and the interior wall of source container 38. This space may be annular in shape if source container 38 is cylindrical, for example. Also, a single perforated baffle plate 54 may be used. Also, the one or more baffle plates 54 may be angularly disposed. Baffle plates 54 limit the amount of liquid treatment reagent which is exhausted through exhaust piping 48.

Figure 3:
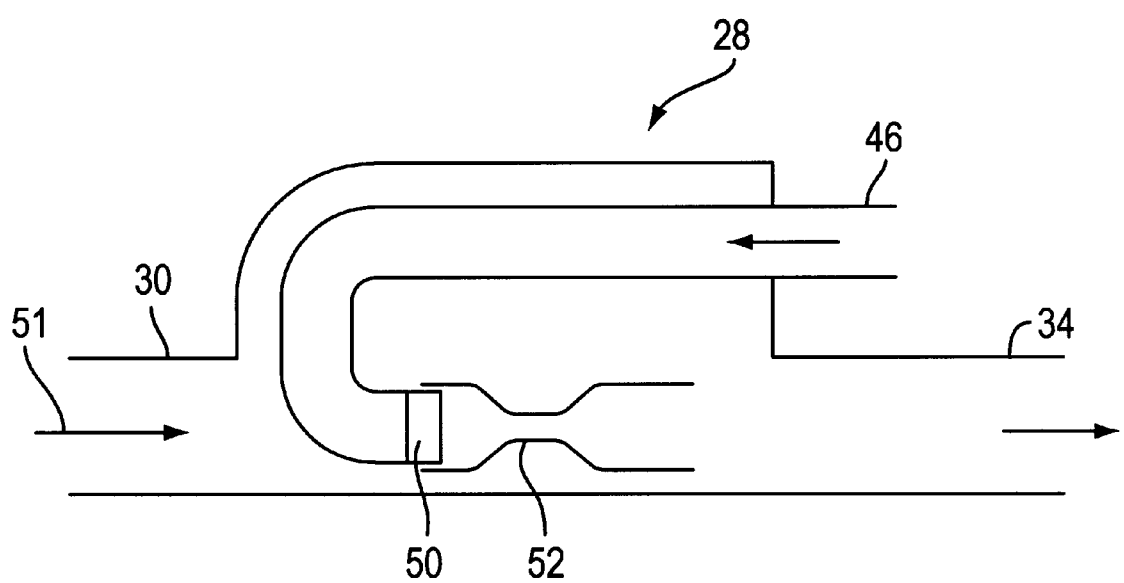
FIG. 3 depicts a venturi eductor unit according to one embodiment of the present invention.

One embodiment of a venturi eductor 28 for use in the present invention is shown in FIG. 3. A circulating liquid treatment reagent enters venturi eductor 28 through venturi input 46. The diameter of venturi input 46 diminishes as the liquid treatment reagent flows through and thus the liquid treatment reagent is accelerated. The accelerated liquid treatment reagent is expelled from venturi input 46 through a nozzle 50 into a venturi 52. The flow of the liquid treatment reagent through venturi 52 creates a low pressure area which creates suction in inlet piping 30. The suction on inlet piping 30 draws the waste gas or liquid into venturi eductor 28 from the waste gas or liquid inlet in the direction of arrow 51. Waste gas or liquid is drawn from inlet piping 30 into venturi eductor 28. The waste gas or liquid combines with liquid treatment reagent in venturi eductor 28. The combined waste gas or liquid and liquid treatment reagent product exit venturi eductor 28 through venturi exhaust piping 34. Venturi eductor 28 may comprise a Teel Model 2P430, for example. Other brands and types of venturi eductors may also be used.

The venturi eduction and scrubbing system 200 as shown in FIG. 2 may operate as follows. A liquid treatment reagent is provided in source container 38 and drain container 32. In a preferred embodiment, drain and source containers 32 and 38 may be about the same size. The total liquid volume is preferably equal to about one half of the total volume of containers 32 and 38.

Liquid treatment reagent is a chemically reactive liquid such as a caustic or acidic or oxidizing solution. Other reagents used for treatment of potentially hazardous waste gas and liquid may also be used. Other examples include a 20% solution of potassium or sodium hydroxide with water, a 10% potassium acid with water, or a 20% sodium hypochlorite with water solution.

Liquid circulating pump 40 draws liquid treatment reagent from source container 38 through source piping 44 and forces it through venturi input 46. The liquid treatment reagent flows through venturi eductors 28 which in turn draws waste gas or liquid from inlet piping 30. Liquid treatment reagent and the waste gas and/or liquid are exhausted through venturi exhaust piping 34 into drain container 32. Some liquid treatment reagent as well as some of the exhausted waste gas and/or liquid thus is always present in drain container 32. Liquid treatment reagent displaces from drain container 32 to source container 38 based on the volume of gases exhausted from venturi eductors 28. Waste gases are exhausted through exhaust piping 48 and may be subjected to further processing, if desired.

As described above, during operation, the flow of liquid treatment reagent through venturi eductors 28 creates a vacuum in inlet piping 30. When liquid circulating pump 40 is stopped or circulation of the liquid treatment reagent ceases, liquid treatment reagent returns to drain container 32 via connection piping 36 until an equilibrium level is obtained with source container 38. Because the volume of liquid treatment reagent has been selected to be about half of the total volume of drain and source containers 32 and 38, the equilibrium level is well below inlet piping 30. Thus, liquid does not enter inlet piping 30 and cannot be drawn into the waste containment vessel.

Secondary containment against possible liquid spill of the liquid treatment reagent may be provided by a reserve container 56 whose volume exceeds the liquid capacity of venturi eduction and scrubbing system 200. Reserve container 56 may be shaped and positioned to catch any spills which may be expelled from venturi eduction and scrubbing system 200.

Figure 4:
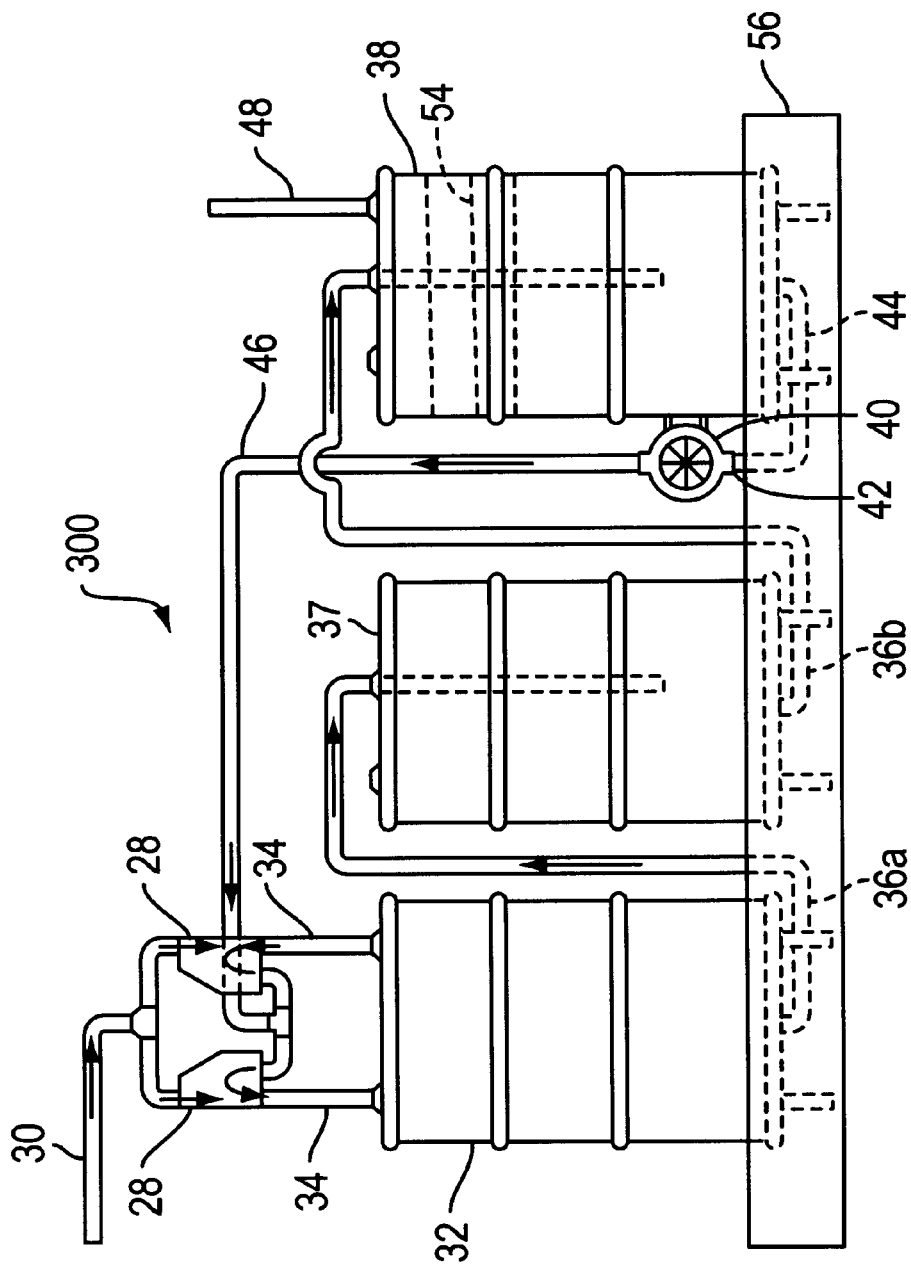
FIG. 4 depicts a venturi eductor and scrubbing system according to another embodiment of the present invention.

It is also possible to provide a plurality of containers in serial fluid communication. FIG. 4 depicts a venturi eduction and scrubbing system 300 having a plurality of containers in serial communication. Like numbered elements represent like elements of FIG. 2. Drain container 32 is connected in serial fluid communication with one or more intermediate drain containers 37 by connection piping 36a. Intermediate drain container 37 is connected in fluid communication with source container 38 by connection piping 36b. If more than one intermediate drain container 37 is used, each is preferably connected in serial fluid communication in the manner as depicted in FIG. 4, for example.

Figure 5:
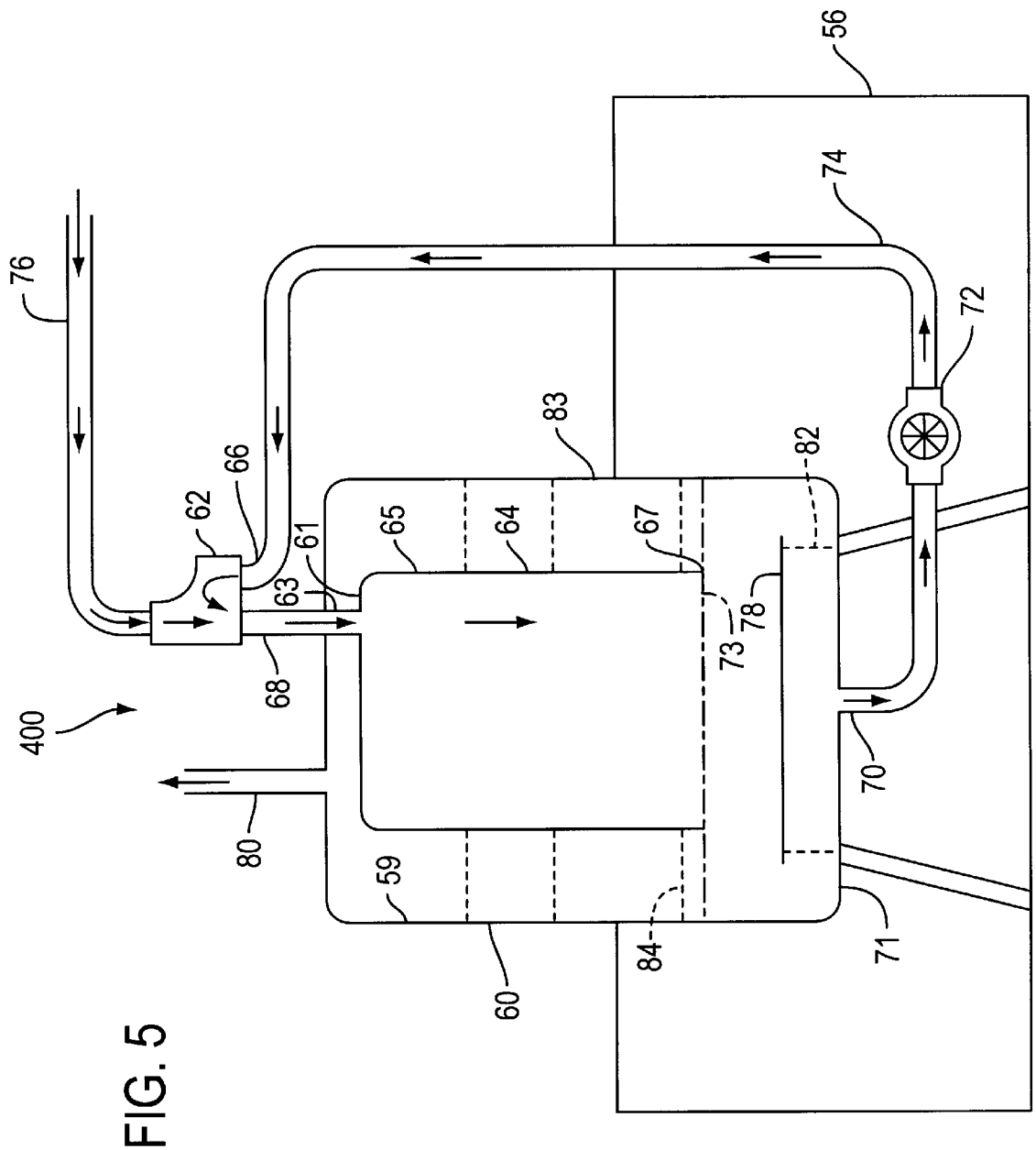
FIG. 5 depicts a venturi eductor and scrubbing system according to another embodiment of the present invention.

Another embodiment of the present invention is shown in FIG. 5. FIG. 5 depicts a venturi eduction and scrubbing system 400 comprising an outer container 60 and one or more internal containers 64. One or more venturi eductors 62 may be mounted on outer container 60. Exhaust from venturi eductors 62 enters an internal container 64 disposed inside outer container 60 through venturi exhaust piping 68. Internal container 64 may comprise a top wall portion 61, one or more openings 63 in top wall portion 61, a side wall portion 65, and an end portion 67. Internal container 64 may be connected to venturi eductors 62 at the one or more openings 63 by venturi exhaust piping 68. Internal container 64 opens into outer container 60 such that end portion 67 is disposed above a bottom portion 71 of outer container 60. In a preferred embodiment, the volume inside internal container 64 (bounded by top wall portion 61, side wall portion 65, and an imaginary plane 73 connecting end portions 67 and a side wall 83 of outer container 60) is approximately equal to the volume of the space defined between an inner surface 59 of outer container 60, top wall portion 61, side wall portion 65 and imaginary plane 73. A suction inlet 76 is connected to venturi eductor 62. Suction inlet 76 is connected to a waste container (not shown) which contains the waste gas or liquid to be neutralized.

Because the force of the output from venturi eductors 62 may be relatively strong, a solid baffle plate 78 may be provided between end portion 67 of internal container 64 and source piping 70 to prevent gas from exiting outer container 60 through source piping 70. Baffle plate 78 thus prevents waste gas from entering liquid pump 72. A perforated baffling system 82 may be provided to support solid baffle plate 78 and to further assist in preventing waste gas from escaping from outer container 60.

Source piping 70 may be connected to a liquid pump 72. Liquid pump 72 may be connected via liquid treatment reagent piping 74 to a venturi inlet 66 of venturi eductor 62. Thereby, interior container 64, outer container 60, liquid pump 72, and venturi eductors 62 may be in serial fluid communication with each other to form a continuous loop through which the liquid treatment reagent travels. Exhaust piping 80 may also be provided for release of gas to an exhaust treatment system where waste gas may be subjected to further processing, if desired.

As gases disperse through the space between internal container 64 and inner surface 61 of outer container 60, it may be desirable to provide perforated baffling to enhance dispersion. In one embodiment of the present invention, venturi eduction and scrubbing system 400 further comprises perforated baffling 84. Baffling 84 is provided to assist in dispersing the waste gas from the liquid treatment reagent for release through exhaust piping 80. Perforated baffling 84 may comprise one or more horizontally disposed baffle plates. Also, perforated baffling 84 may be angularly disposed. Other mechanisms for enhancing dispersion may also be used.

Secondary containment against possible liquid spill of the liquid treatment reagent may be provided by reserve container 56 whose volume exceeds the liquid capacity of venturi eduction and scrubbing system 400. Reserve container 56 may be shaped and positioned to catch any spills which may be expelled from venturi eduction and scrubbing system 400.

Venturi eduction and scrubbing system 400 as shown in FIG. 5 may operate as follows. Preferably, a volume of liquid treatment reagent approximately equal to one half of the volume of outer container 60 is provided in the system comprising outer container 60 and interior container 64. When the pump is not operating, the liquid treatment reagent settles to equilibrium within outer container 60 and inner container 61. During operation, however, liquid treatment reagent is circulated from outer container 60 via source piping 70 by liquid pump 72. Liquid pump 72 forces liquid treatment reagent through liquid treatment reagent piping 74 into venturi inlet 66 of venturi eductors 62. Flow of the liquid treatment reagent through venturi eductors 62 creates a low pressure area and suction in suction inlet 76. Waste liquids or gases are drawn into venturi eductors 62 through suction inlet 76 as a result of the suction generated by venturi eductors 62. The waste liquids or gases react with the liquid treatment reagent which neutralizes the hazardous materials in the waste liquids or gases.

The liquid treatment reagent exits venturi eductors 62 through venturi exhaust pipe(s) 68 into internal container(s) 64. As more gas exhausts from venturi eductors 62, the liquid treatment reagent may be forced from internal container 64 into the space between internal container 64 and the walls of outer container 60.

Failure of liquid pump 72 or interruption of liquid treatment reagent under vacuum conditions causes the liquid treatment reagent to return to its original equilibrium level. No liquid is sucked into suction pipe 76. An advantage of this embodiment is that only one external vessel may be used. Further, any leakage from internal container 64 is caught by outer container 60.

In another embodiment, multiple venturi eductors may be included in these systems instead of one or two venturi eductors. The venturi eductors may exhaust into separate internal containers, several common internal containers, or into a single common internal container, for example.

Figure 6:
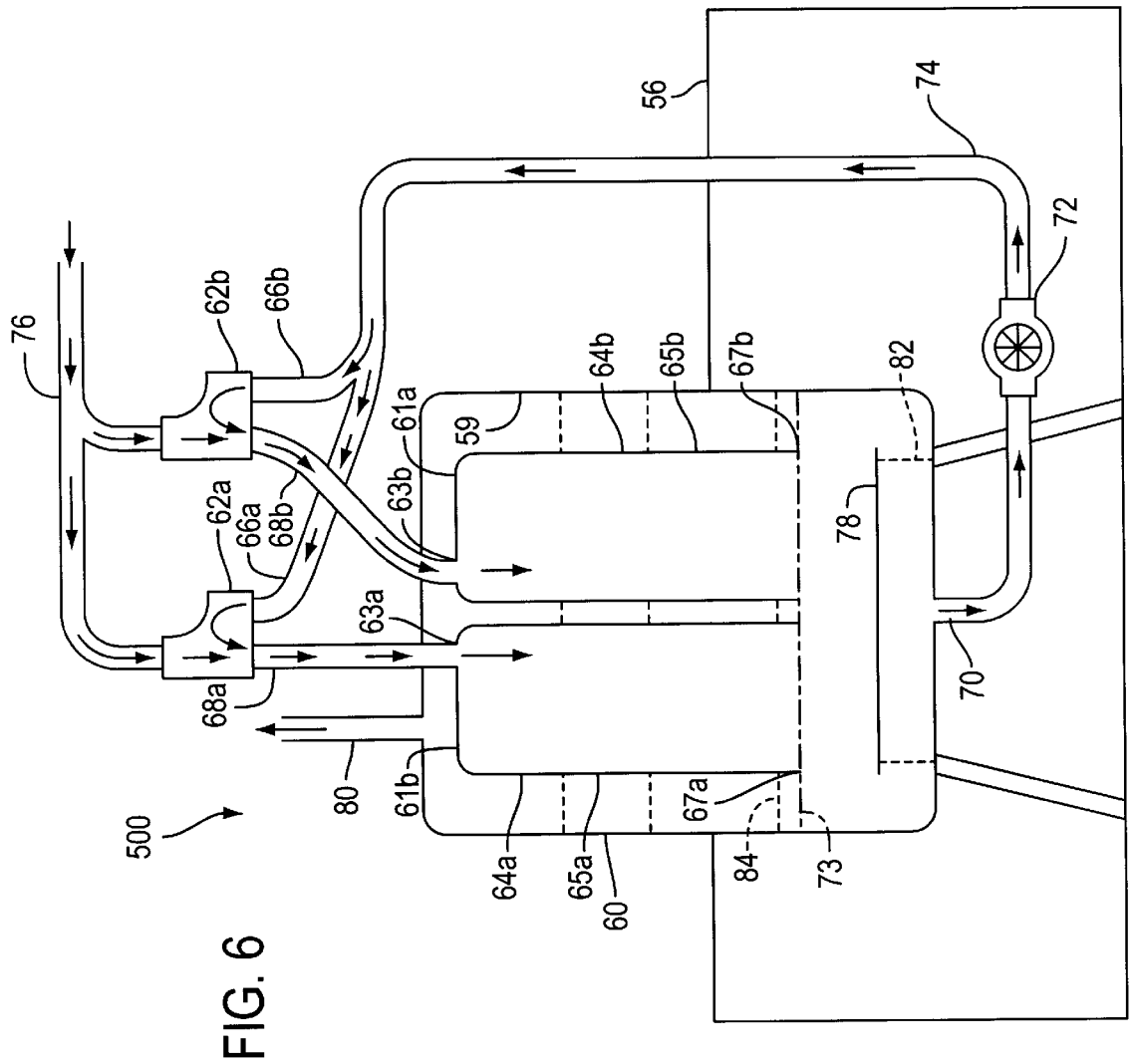
FIG. 6 depicts a venturi eductor and scrubbing system according to another embodiment of the present invention.

In another embodiment, it may be desirable to provide a plurality of internal containers. Accordingly, another embodiment is depicted in FIG. 6. In FIG. 6, like numbered elements represent like components as in FIG. 5. FIG. 6 depicts a venturi eduction and scrubbing system 500 comprising two internal containers 64a and 64b which are connected to venturi eductors 62a and 62b respectively. In this embodiment, the volume defined between inner wall 59 of outer container 60, side walls portions 65a and 65b, top walls portions 61a and 61b and imaginary plane 73 is at least as large as the total volume of internal containers 64a and 64b. The volume of internal container 64a is defined by top wall portion 61a, side wall portion 65a and imaginary plane 73 and the volume of internal container 64b is defined by top wall portion 61a, side wall portion 65a and imaginary plane 73. In this embodiment each internal container is connected to one and only one venturi eductor 62. Also, each internal container 64a and 64b may be connected to a plurality of venturi eductors 62. Also, a plurality of venturi eductors 62 may be connected to a single internal container disposed in outer container 60.

In this embodiment, serial fluid communication is provided from internal containers 64a and 64b (in parallel), outer container 60, liquid pump 72 and venturi eductors 62a and 62b (in parallel). It is also possible to provide more than two internal containers. In each embodiment, it may be desirable to provide each of the internal containers in parallel. If a plurality of venturi eductors are provided, the venturi eductors are preferably arranged in parallel as well.

In another embodiment, an internal container may be provided in the embodiment of FIGS. 2 and 4. For example, one or more internal containers 64 may be connected to venturi exhaust piping 34 and be disposed inside drain container 32. In this embodiment, exhaust piping 48 may be provided in drain container 32 or source container 38 or both.

Another embodiment incorporates an additional scrubbing method by spraying liquid reagent on top of baffles 54 of FIGS. 2 and 4, or baffles 84 of FIGS. 5 and 6, which may further include packings, to increase the efficiency of the treatment process. Other variations are also possible without departing from the scope of the present invention.

Although the present invention and its advantages have been described in detail, it should be understood that various changes, substitutions, and alterations can be made therein without departing from the spirit and scope of the invention as defined by the appended claims.

We claim:

1. A venturi eduction and scrubbing system comprising:
   a first container having a liquid treatment reagent therein at a first liquid level;
   a second container in fluid communication with the first container and having liquid treatment reagent therein at a second liquid level;
   at least one venturi eductor connected to a waste inlet and the first container and being disposed above the first and second liquid level, the waste inlet containing waste gas or liquid to be processed; and
   a pump connected to the second container and the first venturi eductor to enable liquid treatment reagent to be pumped from the second container into the first venturi eductor such that the waste gas or liquid is drawn from the waste inlet into the at least one venturi eductor where it is combined with the liquid treatment reagent and is thereby neutralized.

2. The system of claim 1 further comprising an exhaust means connected to the second container for exhausting gases from the first and second containers.

3. The system of claim 2 further comprising perforated baffle means disposed between the exhaust means and a connection between the first and second container for limiting exhaust of liquid treatment reagent from the second container.

4. The system of claim 3 wherein the perforated baffle means comprises at least one baffle plate.

5. The system of claim 4 wherein at least one of the baffle plates is perpendicular with respect to a wall of the second container.

6. The system of claim 1 further comprising reservoir means for retaining any spillage from the first and second containers, venturi eductors or pump.

7. The system of claim 6 wherein the first and second containers, venturi eductors and pump have a total volumetric liquid capacity of the system and wherein the reservoir means has a volume which is greater than the total liquid capacity of the system.

8. The system of claim 1 wherein the second container is disposed within the first container.

9. The system of claim 8 wherein the second container comprises a top wall portion, a side wall portion, and an end portion;

wherein the first container comprises an inner surface;

wherein the top wall portion of the second container, the side wall portion of the second container, and a plane connecting the end portion to the inner surface of the first container define a first volume;

wherein the top wall portion of the second container, the side wall portion of the second container, the inner surface of the first container, and the plane define a second volume; and wherein the first volume is approximately equal to the second volume.

10. The system of claim 8 wherein the second container comprises at least one opening which is connected to at least one of the venturi eductors.

11. The system of claim 10 further comprising:

source piping which connects the second container to the pump; and solid baffle means disposed between the second end of the second container and the source piping for preventing gas from entering the source piping.

12. The system of claim 1 wherein the venturi eductors, the first container, the second container, and the pump are in serial fluid communication.

13. The system of claim 1 further comprising connection piping means for connecting the first container to the second container.

14. The system of claim 1 further comprising one or more additional containers in serial communication with the first and second containers.

15. The system of claim 1 further comprising a plurality of containers, each container being connected to a venturi eductor.

16. The system of claim 15 wherein each of the plurality of containers is disposed within the first container.

* * * * *